(12) United States Patent
Ren et al.

(10) Patent No.: US 11,754,744 B2
(45) Date of Patent: Sep. 12, 2023

(54) SURFACE WAVE PROSPECTING METHOD FOR JOINTLY EXTRACTING RAYLEIGH WAVE FREQUENCY DISPERSION CHARACTERISTICS BY SEISMOELECTRIC FIELD

(71) Applicant: SOUTHERN UNIVERSITY OF SCIENCE AND TECHNOLOGY, Guangdong (CN)

(72) Inventors: Hengxin Ren, Shenzhen (CN); Zhentao Yang, Shenzhen (CN); Xiaofei Chen, Shenzhen (CN); Shichuan Yuan, Shenzhen (CN); Xuzhen Zheng, Shenzhen (CN); Zhanxiang He, Shenzhen (CN)

(73) Assignee: SOUTHERN UNIVERSITY OF SCIENCE AND TECHNOLOGY, Shenzhen (CN)

( * ) Notice: Subject to any disclaimer, the term of this patent is extended or adjusted under 35 U.S.C. 154(b) by 238 days.

(21) Appl. No.: 17/420,928

(22) PCT Filed: Mar. 4, 2020

(86) PCT No.: PCT/CN2020/077697
§ 371 (c)(1),
(2) Date: Jul. 6, 2021

(87) PCT Pub. No.: WO2021/174434
PCT Pub. Date: Sep. 10, 2021

(65) Prior Publication Data
US 2022/0350046 A1    Nov. 3, 2022

(51) Int. Cl.
*G01V 11/00* (2006.01)
*G01V 1/28* (2006.01)
*G01V 3/12* (2006.01)

(52) U.S. Cl.
CPC .............. *G01V 11/007* (2013.01); *G01V 1/28* (2013.01); *G01V 3/12* (2013.01)

(58) Field of Classification Search
CPC ........... G01V 11/007; G01V 1/28; G01V 3/12
See application file for complete search history.

(56) References Cited

U.S. PATENT DOCUMENTS

| 5,486,764 A | 1/1996 | Thompson et al. |
| 5,511,040 A | 4/1996 | Nyland |

(Continued)

FOREIGN PATENT DOCUMENTS

| CN | 101535840 A | 9/2009 |
| CN | 104678435 A | 6/2015 |

(Continued)

OTHER PUBLICATIONS

Translation of International Search Report dated Dec. 11, 2020 in corresponding International Application No. PCT/CN2020/077697; 4 pages.

*Primary Examiner* — Ian J Lobo
(74) *Attorney, Agent, or Firm* — Maier & Maier, PLLC

(57) ABSTRACT

A surface wave prospecting method for jointly extracting Rayleigh wave frequency dispersion characteristics in a seismoelectric field. A surface wave prospecting method includes following steps of: acquiring jointly acquired data, where the jointly acquired data includes seismic wave data and electric field data; carrying out jointly imaging processing on jointly acquired data to obtain a superposed frequency dispersion spectrum; carrying out extraction processing on superposed frequency dispersion spectrum to obtain a frequency dispersion curve, outperforming inversion processing on frequency dispersion curve to obtain a stratum structure profile. As seismic wave data and electric field data are adopted to carry out combined imaging processing to obtain superposed frequency dispersion spectrum, (Continued)

multi-mode frequency dispersion curve is extracted, multiplicity of solutions of inversion is greatly reduced during inversion, precision and stability of surface wave prospecting are greatly improved.

7 Claims, 6 Drawing Sheets

(56) References Cited

U.S. PATENT DOCUMENTS

| | | | | |
|---|---|---|---|---|
| 7,340,348 | B2* | 3/2008 | Strack | G01V 11/007 |
| | | | | 702/14 |
| 8,633,700 | B1* | 1/2014 | England | G01V 11/007 |
| | | | | 324/348 |
| 8,861,308 | B2* | 10/2014 | Virgilio | G01V 1/30 |
| | | | | 702/14 |
| 9,239,397 | B2* | 1/2016 | Thompson | G01V 1/20 |
| 11,555,936 | B2* | 1/2023 | Hou | G01V 1/284 |
| 11,561,312 | B2* | 1/2023 | Alyousuf | G01V 1/284 |
| 2019/0250305 | A1 | 8/2019 | Thompson et al. | |

FOREIGN PATENT DOCUMENTS

| | | |
|---|---|---|
| CN | 105676281 A | 6/2016 |
| CN | 105891896 A | 8/2016 |
| CN | 106646615 A | 5/2017 |
| CN | 108802816 A | 11/2018 |
| CN | 109239773 A | 1/2019 |
| CN | 109799530 A | 5/2019 |
| CN | 109923440 A | 6/2019 |
| CN | 110095809 A | 8/2019 |
| CN | 111290017 A | 6/2020 |
| WO | 2019/049263 A1 | 3/2019 |

* cited by examiner

SURFACE WAVE PROSPECTING METHOD FOR JOINTLY EXTRACTING RAYLEIGH WAVE FREQUENCY DISPERSION CHARACTERISTICS BY SEISMOELECTRIC FIELD

CROSS-REFERENCES TO RELATED APPLICATIONS

This application is a national stage application of PCT Patent Application No. PCT/CN2020/077697, filed on Mar. 4, 2020, the content of all of which is incorporated herein by reference.

FIELD

The present invention relates to the technical field of geological and geophysical prospecting, in particular to a surface wave prospecting method for jointly extracting a plurality of Rayleigh wave frequency dispersion characteristics by a seismoelectric field.

BACKGROUND

A Rayleigh wave was first determined theoretically by British scientist Lord Rayleigh in 1887, and it is hence named. Since the 1950s, with a continuous in-depth research of a plurality of scientists, it has been discovered that when the Rayleigh wave propagates in a layered medium, it carries a plurality of media information including a P-wave velocity, an S-wave velocity, and a density of each layer of the medium, shown a frequency dispersion characteristic in obvious (that is, a velocity changes following a change of the frequency), and it mainly depends on a structure of the S-wave velocity of the layered medium. Therefore, a plurality of change characteristics of an energy and a velocity of the Rayleigh wave in a propagation process have carried a plurality of stratum information. Therefore, in an engineering field, the Rayleigh wave dispersion characteristics are often studied to solve a plurality of shallow layer geological issues including an engineering survey, a site and foundation treatment evaluation, an obstacle and cavity detection, and more. At the present art, a surface wave prospecting has become one of the most widely used geophysical prospecting methods in the field of engineering geophysical prospecting.

In a plurality of practical applications, a plurality of scholars have found that if the surface wave prospecting only uses a basic-order mode surface wave frequency dispersion information for an inversion, a stratigraphic model obtained thereby has a great uncertainty. However, the uncertainty will be greatly reduced by a jointly inversion of the basic-order mode and a high-order mode; and in an engineering prospecting, it is often encountered that in a certain frequency range, the Rayleigh wave in the high-order mode has a stronger energy than that in the basic-order mode, which means that in a certain frequency ranges, we can only get a dispersion curve of the high-order mode. At the present stage, the surface wave prospecting methods are all extracting the dispersion information from fluctuation information of the surface wave, although the basic-order mode can perform better in imaging, the high-order mode, especially a higher-order mode, has a dispersion imaging accuracy limited.

Therefore, the current technology needs to be improved and developed.

BRIEF SUMMARY OF THE INVENTION

According to the above described defects, the purpose of the present invention is providing a surface wave prospecting method for jointly extracting the Rayleigh wave frequency dispersion characteristics in a seismoelectric field, in order to solve a problem in the prior art that the high-order mode has a dispersion imaging accuracy low.

A technical solution of the present invention to solve the technical problems is as follows:

a surface wave prospecting method for jointly extracting a plurality of Rayleigh wave frequency dispersion characteristics by a seismoelectric field, wherein comprising a plurality of steps:

acquiring a plurality of jointly collected data; wherein the jointly collected data comprises a seismic wave data and an electric field data;

performing a jointly imaging processing onto the jointly collected data to obtain a superposed dispersion spectrum;

performing an extraction processing onto the superposed dispersion spectrum to obtain a dispersion curve, and performing an inversion processing onto the dispersion curve to obtain a stratum structure profile.

The surface wave prospecting method for jointly extracting the Rayleigh wave frequency dispersion characteristics by the seismoelectric field, wherein the seismic wave data comprises a seismic wave component; the electric field data composes an electric field component;

the performing a jointly imaging processing onto the jointly collected data to obtain the superposed dispersion spectrum, comprising:

obtaining a dispersion spectrum of the seismic wave component and a dispersion spectrum of the electric field component according to the seismic wave component and the electric field component, respectively;

superposing the dispersion spectrum of the seismic wave component and the dispersion spectrum of the electric field component, to obtain a superposed dispersion spectrum.

The surface wave prospecting method for jointly extracting the Rayleigh wave frequency dispersion characteristics by the seismoelectric field, wherein the obtaining the dispersion spectrum of the seismic wave component and the dispersion spectrum of the electric field component according to the seismic wave component and the electric field component, respectively, comprising:

extracting respectively an imaginary part of the seismic wave component and an imaginary part of the electric field component, before performing a frequency scanning to obtain the dispersion spectrum of the seismic wave component and the dispersion spectrum of the electric field component.

The surface wave prospecting method for jointly extracting the Rayleigh wave frequency dispersion characteristics by the seismoelectric field, wherein the seismic wave component comprises: a seismic wave radial component and/or a seismic wave vertical component; the electric field component comprises: an electric field radial component and/or an electric field vertical component.

The surface wave prospecting method for jointly extracting the Rayleigh wave frequency dispersion characteristics by the seismoelectric field, wherein the superposing the dispersion spectrum of the seismic wave component and the dispersion spectrum of the electric field component, to obtain the superposed dispersion spectrum, comprising:

superposing the dispersion spectrum of the seismic wave vertical component and the dispersion spectrum of the electric field radial component to obtain the superposed dispersion spectrum; or superposing the dispersion spectrum of the seismic wave radial component and the dispersion spectrum of the electric field radial component to obtain the superposed dispersion spectrum; or superposing the dispersion spectrum of the seismic wave vertical component, the dispersion spectrum of the seismic wave radial component and the dispersion spectrum of the electric field radial component to obtain the superposed dispersion spectrum.

The surface wave prospecting method for jointly extracting the Rayleigh wave frequency dispersion characteristics by the seismoelectric field, wherein the performing the extraction processing onto the superposed dispersion spectrum to obtain the dispersion curve, comprising:

extracting the superposed dispersion spectrum by an energy maximum to obtain the dispersion curve; the dispersion curve is a multi-mode dispersion curve comprising the basic-order mode and the high-order mode.

The surface wave prospecting method for jointly extracting the Rayleigh wave frequency dispersion characteristics by the seismoelectric field, wherein performing the inversion processing onto the dispersion curve to obtain the stratum structure profile, comprising:

establishing an initial inversion stratum model, and using a plurality of inversion methods to fit the dispersion curve to obtain the stratum structure profile; the inversion methods comprise at least one of: a genetic algorithm, a swarm algorithm, and a quasi-Newton algorithm.

A surface wave prospecting device for jointly extracting the Rayleigh wave frequency dispersion characteristics by the seismoelectric field, wherein comprising:

a collection device, applied to acquiring the plurality of jointly collected data; wherein the plurality of jointly collected data comprises: a seismic wave data and an electric field data;

a jointly imaging device, applied to performing a jointly imaging processing onto the jointly collected data to obtain the superposed dispersion spectrum;

an inversion device, applied to performing the extraction processing onto the superposed dispersion spectrum to obtain the dispersion curve, and performing the inversion processing onto the dispersion curve to obtain the stratum structure profile.

A terminal device, wherein comprising: a processor, and a storage connected to the processor, the storage has a surface wave prospecting program for extracting the Rayleigh wave dispersion characteristics jointly by the seismoelectric field stored, and a plurality of following steps are implemented when the surface wave prospecting program for extracting the Rayleigh wave dispersion characteristics jointly by the seismoelectric field is executed by the processor:

acquiring the plurality of jointly collected data; wherein the plurality of jointly collected data comprises: a seismic wave data and an electric field data;

performing a jointly imaging processing onto the jointly collected data to obtain the superposed dispersion spectrum;

performing the extraction processing onto the superposed dispersion spectrum to obtain the dispersion curve, and performing the inversion processing onto the dispersion curve to obtain the stratum structure profile.

A storage medium, wherein the storage medium has the surface wave prospecting program for jointly extracting the Rayleigh wave dispersion characteristics by the seismoelectric field stored, and a plurality of following steps are implemented when the surface wave prospecting program for extracting the Rayleigh wave dispersion characteristics jointly by the seismoelectric field is executed by the processor:

acquiring the plurality of jointly collected data; wherein the plurality of jointly collected data comprises: a seismic wave data and an electric field data;

performing the jointly imaging processing onto the jointly collected data to obtain the superposed dispersion spectrum;

performing the extraction processing onto the superposed dispersion spectrum to obtain the dispersion curve, and performing the inversion processing onto the dispersion curve to obtain the stratum structure profile.

Benefits: Since adopting both the seismic wave data and the electric field data to perform the imaging processing jointly to obtain the superposed dispersion spectrum, before extracting and obtaining the multi-mode dispersion curve, an ambiguity of the inversion is greatly reduced during the inversion, thereby an accuracy and a stability of the surface wave prospecting has been greatly improved.

DETAILED DESCRIPTION OF THE EMBODIMENTS

Figure 1:
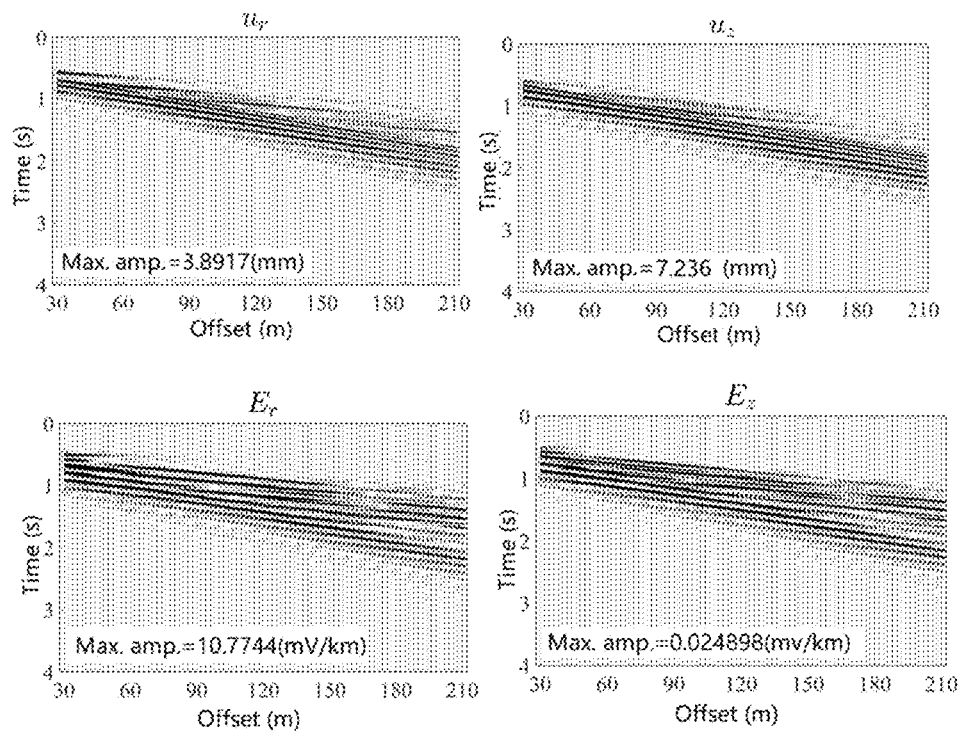
FIG. 1 illustrates a shot set record of a linear observation system in the present invention receiving the seismic wave components $u_r$, $u_z$, and the electric field components $E_r$, $E_z$.

In order to make the purpose, technical solution and the advantages of the present invention clearer and more explicit, further detailed descriptions of the present invention are stated herein, referencing to the attached drawings and some embodiments of the present invention. It should be understood that the detailed embodiments of the invention described herein are used to explain the present invention only, instead of limiting the present invention.

Referencing from FIG. 1 to FIG. 9 together, the present invention provides a plurality of preferred embodiments on a surface wave prospecting method for jointly extracting a plurality of Rayleigh wave frequency dispersion characteristics by a seismoelectric field.

A seismoelectric effect was first discovered in 1939 by a former Soviet Union scientist Ivanov, without applying a voltage, an electric field caused by a seismic wave was measured, and it was pointed out that this may be related to an electrokinetic effect of an electric double layer. Since then, Frenkel established a wave theory in a porous medium that a solid phase motion is coupled with a fluid motion between a plurality of pores, which was further improved by Biot, before forming a well-known Biot theoretical model of elastic wave in porous medium. In the 1990s, following a development of electronic science and technology and an improvement in a weak signal extraction and a signal processing method, a study on the seismoelectric effect has made a great progress. In 1994, based on the work of Frenkel and Biot, Pride proposed a group of equations on a macroscopic control for seismoelectric coupling. The group of equations has coupled a group of Biot pores elastic equations with a group of Maxwell electromagnetic equations together through a plurality of electrokinetic coupling coefficients, which describes a coupling relationship between a wave field and an electromagnetic field in a saturated porous medium, which has now become a basis of a seismoelectric theory research.

In a wave field simulation study of a layered porous medium model, it is found that when a seismic wave enters a porous medium interface exceeding a critical angle, a kind of electromagnetic (EM) wave, which is called evanescent EM wave, is generated by a seismoelectric conversion and is featured by rapid amplitude decay when leaving away from the interface. A plurality of studies have found that an evanescent electromagnetic wave generated by a Rayleigh wave excited by a vertical single-force point source has a same dispersion characteristic as the Rayleigh wave, which has provided a theoretical basis for extracting a dispersion information of a surface wave by receiving an evanescent electromagnetic wave signal generated by the surface wave. Studies have shown that a dispersion spectrum calculated by the evanescent electromagnetic wave contains a high-order mode information in rich and having a high-quality, while a dispersion in the high-order modes cannot be provided by a dispersion spectrum calculated directly by using a seismic wave (a Rayleigh wave). In addition, for a basic-order mode, a frequency range of the evanescent electromagnetic wave having a significant energy in the dispersion spectrum is not totally as same as that in a frequency range of the seismic wave, while forming a complementary. Therefore, the evanescent electromagnetic wave (EM) generated by a seismoelectric conversion has a great potential to improve a quality of a Rayleigh wave dispersion imaging, which has a great significance for further improving an accuracy of a Rayleigh surface wave prospecting.

Figure 9:
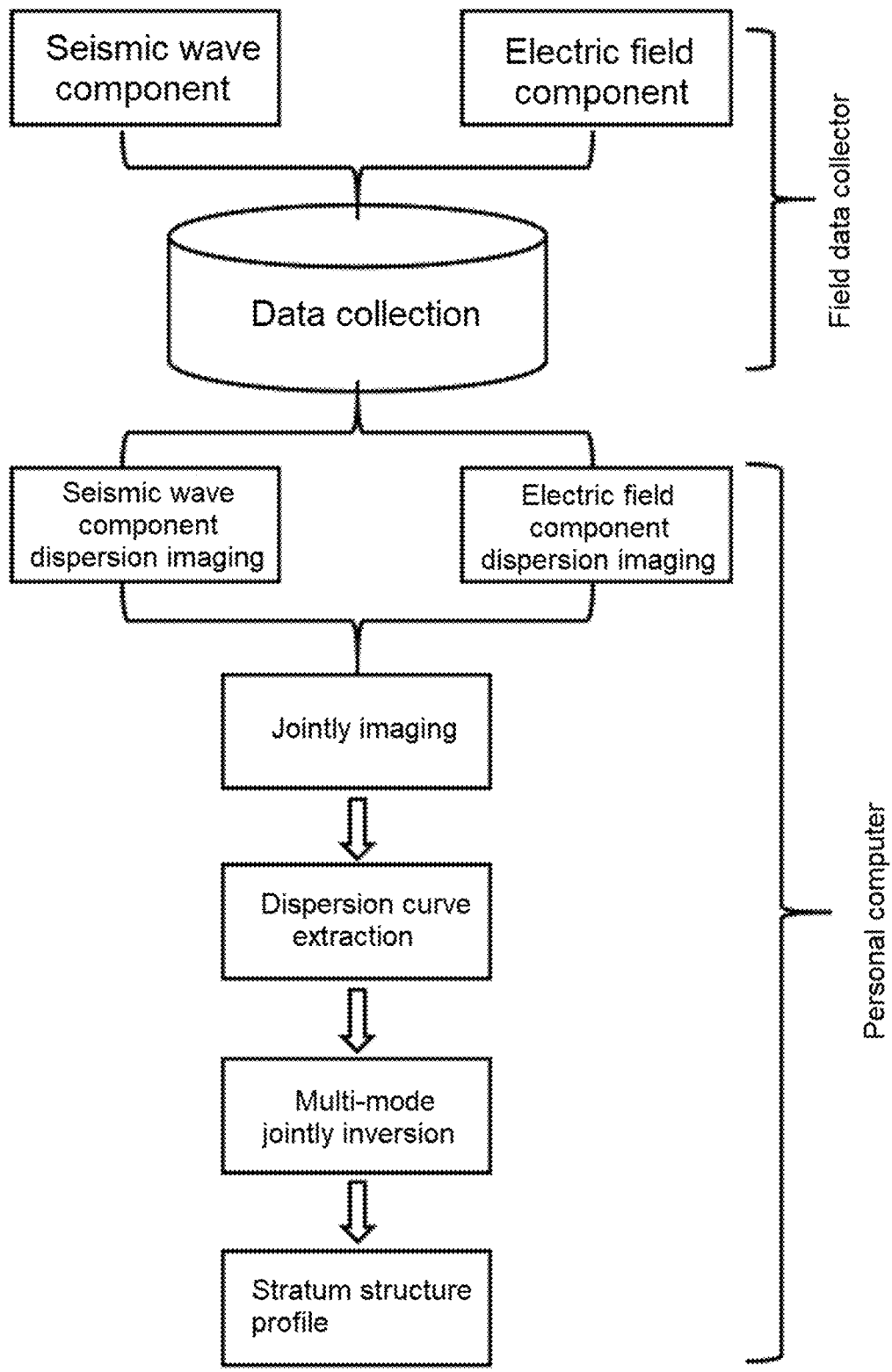
FIG. 9 illustrates a flow chart on the surface wave prospecting method for jointly extracting the Rayleigh wave frequency dispersion characteristics by a seismoelectric field.

Shown as FIG. 9, a surface wave prospecting method for jointly extracting the Rayleigh wave frequency dispersion characteristics by a seismoelectric field disclosed in the present invention, comprises a plurality of following steps:

S100. acquiring a plurality of jointly collected data; wherein the jointly collected data comprises a seismic wave data and an electric field data.

Specifically, the jointly collected data may further comprises a magnetic field data. The seismic wave data comprises a seismic wave component; the electric field data composes an electric field component. More specifically, the seismic wave component comprises a seismic wave radial component $u_r$, and/or a seismic wave vertical component $u_z$; the electric field component comprises a electric field radial component $E_r$, and/or an electric field vertical component $E_z$.

In a practical engineering application, a seismic source used in a transient Rayleigh wave prospecting is generally generated by a hammer hit, a hammer drop and more seismic sources, which can be approximated as a single point force source in a vertical direction, and generates theoretically only a longitudinal wave (P wave) and a vertical component transverse wave. (SV wave) as well as an electromagnetic field of a transverse magnetic mode. The P wave and the SV wave after excitation are coherent before generating a Rayleigh wave and an evanescent electromagnetic wave correspondingly. Thus in an actual prospecting, a radial component and a vertical component of the Rayleigh wave (in a cylindrical coordinate system), as well as a radial component and a vertical component of the electric field, together with a transverse component of a magnetic field. Since the component of the magnetic field is weak, in the present embodiment, only the seismic wave components and the electric field components are considered.

Since a signal of the electric field component is weaker than a signal of the seismic wave, the collection device adopts a different noise reduction system and a different front amplification system. After a seismic source is excited by a hammer hit, two different sensors of cosmic and electric will conduct a high-frequency digital sampling at a same time.

S200. performing a jointly imaging processing onto the jointly collected data to obtain a superposed dispersion spectrum.

Specifically, the step S200 comprises:

S210. obtaining a dispersion spectrum of the seismic wave component and a dispersion spectrum of the electric field component according to the seismic wave component and the electric field component, respectively.

S210 comprises a plurality of steps:

S211. extracting respectively an imaginary part of the seismic wave component and an imaginary part of the electric field component, before performing a frequency scanning to obtain the dispersion spectrum of the seismic wave component and the dispersion spectrum of the electric field component.

In a horizontal layered formation model, a response wave field of a pulse seismic source time function, such as $G(r,\theta,z,\omega)$ can be expressed as:

$$G(r, \theta, z, \omega) = \frac{1}{2\pi} \sum_{m=-\infty}^{+\infty} \int_0^{+\infty} \{G_{T,m}(z, k', \omega)T_k^m(r, \theta) + G_{S,m}(z, k', \omega)S_k^m(r, \theta) + G_{R,m}(z, k', \omega)R_k^m(r, \theta)\}k'dk', \quad (1)$$

Wherein, k' is all possible horizontal wave numbers, $T_k'^m(r,\theta)$ $S_{k'}^m(r,\theta)$ $R_{k'}^m(r,\theta)$ are a set of complete orthogonal vector basis functions, a specific expression is as follows:

$$\begin{cases} T_k^m(r,\theta) = (1/k')\nabla \times [e_z Y_{k'}^m(r,\theta)], \\ S_{k'}^m(r,\theta) = (1/k')\nabla Y_{k'}^m(r,\theta), \\ R_{k'}^m(r,\theta) = -e_z Y_{k'}^m(r,\theta), \end{cases} \quad (2)$$

Wherein $Y_{k'}^m(r,\theta) = J_m(k'r)e^{im\theta}$, i is an imaginary unit, $m=0, \pm 1, \pm 2, \ldots$, $k' \in (0, +\infty)$. $J_m(k'r)$ represents an m-order Bessel function of first kind. $G_{T,m}$, $G_{S,m}$ and $G_{R,m}$ in formula 1 are a plurality of expending coefficients according to a basis function, represented specifically as:

$$\begin{cases} G_{T,m}(z, k', \omega) = \int_0^{2\pi}\int_0^{+\infty} G(r,\theta,z,\omega) \Box [T_{k'}^m(r,\theta)]^* r dr d\theta, \\ G_{S,m}(z, k', \omega) = \int_0^{2\pi}\int_0^{+\infty} G(r,\theta,z,\omega) \Box [S_{k'}^m(r,\theta)]^* r dr d\theta, \\ G_{R,m}(z, k', \omega) = \int_0^{2\pi}\int_0^{+\infty} G(r,\theta,z,\omega) \Box [R_{k'}^m(r,\theta)]^* r dr d\theta, \end{cases} \quad (3)$$

Wherein a symbol * represents a complex conjugate. In a cylindrical coordinate system, $G(r,\theta,z,\omega)$ may also be expressed as:

$$G(r,\theta,z,\omega) = G_r(r,\theta,z,\omega)e_r + G_\theta(r,\theta,z,\omega)e_\theta + G_z(r,\theta,z,\omega)e_z. \quad (4)$$

Combining (1), (2), (3), (4), and considering a derivative property of 0-order Bessel function of first kind: $J_0'(k'r) = -J_1(k'r)$, we will get:

$$\begin{cases} G_r(r,\omega,z) = \frac{1}{2\pi}\int_0^{+\infty} [-G_{S,0}(k',\omega,z)J_1(k'r)]k'dk', \\ G_\theta(r,\omega,z) = \frac{1}{2\pi}\int_0^{+\infty} [G_{T,0}(k',\omega,z)J_1(k'r)]k'dk', \\ G_z(r,\omega,z) = \frac{1}{2\pi}\int_0^{+\infty} [-G_{R,0}(k',\omega,z)J_0(k'r)]k'dk'. \end{cases} \quad (5)$$

According to an orthogonal property of the Bessel function:

$$\int_0^{+\infty} J_m(k'r)J_m(kr) r dr = \frac{\delta(k'-k)}{k'}$$

(wherein k is the horizontal wave number observed), from formula 5, one can get:

$$\int_0^{+\infty} G_r(r,\omega,z) J_1(kr) r dr = \quad (6)$$

$$\frac{1}{2\pi}\int_0^{+\infty}\left[-G_{S,0}(k',\omega,z)\int_0^{+\infty} J_1(k'r)J_1(kr) r dr\right] k'dk' =$$

$$-\frac{1}{2\pi}G_{S,0}(k,\omega,z),$$

$$\int_0^{+\infty} G_\theta(r,\omega,z) J_1(kr) r dr = \quad (7)$$

$$\frac{1}{2\pi}\int_0^{+\infty}\left[-G_{T,0}(k',\omega,z)\int_0^{+\infty} J_1(k'r)J_1(kr) r dr\right] k'dk' =$$

$$\frac{1}{2\pi}G_{T,0}(k,\omega,z),$$

$$\int_0^{+\infty} G_z(r,\omega,z) J_0(kr) r dr = \quad (8)$$

$$\frac{1}{2\pi}\int_0^{+\infty}\left[-G_{R,0}(k',\omega,z)\int_0^{+\infty} J_0(k'r)J_0(kr) r dr\right] k'dk' =$$

$$-\frac{1}{2\pi}G_{R,0}(k,\omega,z).$$

Defining a kernel function as follows:

$$\begin{cases} G_S(k,\omega,z) = -\frac{1}{2\pi}G_{S,0}(k,\omega,z), \\ G_T(k,\omega,z) = \frac{1}{2\pi}G_{T,0}(k,\omega,z), \\ G_R(k,\omega,z) = -\frac{1}{2\pi}G_{R,0}(k,\omega,z). \end{cases} \quad (9)$$

Taking the formula 9 into the formulas (6)-(8), and getting:

$$\begin{cases} \int_0^{+\infty} G_r(r,\omega,z) J_1(kr) r dr = G_S(k,\omega,z), \\ \int_0^{+\infty} G_\theta(r,\omega,z) J_1(kr) r dr = G_T(k,\omega,z), \\ \int_0^{+\infty} G_z(r,\omega,z) J_0(kr) r dr = G_R(k,\omega,z). \end{cases} \quad (10)$$

Since there is a following relationship between a response wave field $G(r,\theta,z,\omega)$ of a pulse source time function and an actual source time function $F(\omega)$ as well as an actual wave field $U(r,\theta,z,\omega)$:

$$U(r,\theta,z,\omega) = F(\omega)G(r,\theta,z,\omega) \quad (11)$$

Therefore, the radial component $u_r$ and the vertical component $u_z$ of the seismic wave (in a cylindrical coordinate system), as well as the radial component $E_r$ and the vertical component $E_z$ of the electric field, according to the formulas of (10) and (11), may be expressed as:

$$\begin{cases} \int_0^{+\infty} [u_r(r,\omega,z)/F(\omega)] J_1(kr) r dr = u_S(k,\omega,z), \\ \int_0^{+\infty} [u_z(r,\omega,z)/F(\omega)] J_0(kr) r dr = u_R(k,\omega,z), \\ \int_0^{+\infty} [E_r(r,\omega,z)/F(\omega)] J_1(kr) r dr = E_S(k,\omega,z), \\ \int_0^{+\infty} [E_z(r,\omega,z)/F(\omega)] J_0(kr) r dr = E_R(k,\omega,z), \end{cases} \quad (12)$$

Wherein $u_S(k,\omega,z)$, $u_R(k,\omega,z)$, $E_S(k,\omega,z)$, $E_R(k,\omega,z)$ are the core functions of the wave and the electric field; $F(\omega)$ represents the actual source time function; $u_r(r,\omega,z)$, $u_z(r,\omega,z)$, $E_r(r,\omega,z)$, $E_z(r,\omega,z)$ are a plurality of Fourier transforms of a plurality of time domain wavefield components $u_r(r,t,z)$, $u_z(r,t,z)$, $E_r(r,t,z)$, $E_z(r,t,z)$; in a real observation, r and z represents individually a radial distance between a receiver and the source as well as a depth of the receiver.

Therefore, in a surface wave prospecting, an integral in (12) can be approximated as a summation, and an imaginary part thereof is taken for a frequency scanning before obtaining the dispersion spectrum. A specific formula is as follows:

$$\begin{cases} \text{Im}\left[\sum_{j=1}^{N}\int_{r_{j-1}}^{r_j}[u_r(r,\omega,z)/F(\omega)]J_1(kr)rdr\right] = \tilde{u}_r(k,\omega,z), \\ \text{Im}\left[\sum_{j=1}^{N}\int_{r_{j-1}}^{r_j}[u_z(r,\omega,z)/F(\omega)]J_0(kr)rdr\right] = \tilde{u}_z(k,\omega,z), \\ \text{Im}\left[\sum_{j=1}^{N}\int_{r_{j-1}}^{r_j}[E_r(r,\omega,z)/F(\omega)]J_1(kr)rdr\right] = \tilde{E}_r(k,\omega,z), \\ \text{Im}\left[\sum_{j=1}^{N}\int_{r_{j-1}}^{r_j}[E_z(r,\omega,z)/F(\omega)]J_0(kr)rdr\right] = \tilde{E}_z(k,\omega,z), \end{cases} \quad (15)$$

Wherein $\tilde{u}_r(k,\omega,z)$, $\tilde{u}_z(k,\omega,z)$, $\tilde{E}_r(k,\omega,z)$ and $\tilde{E}_z(k,\omega,z)$ represent the dispersion spectrums obtained by an approximation; $\text{Im}[\cdot]$ represents calculating an imaginary part of a complex variable; k represents the horizontal wave number of an observation, $\omega$ is the angular frequency, and N represents a total number of recording tracks; $r_j$ represents the radial distance from a j-th geophone to the source, since a surface wave prospecting is based on a horizontal strata, all sensors and the seismic source, do not require a plurality of the sensors to be arranged in a linear equidistance or in a plurality of other regular shapes, or maintain a certain offset from the seismic source, therefore the geophones can be arranged arbitrarily according to an actual situation. That is, in the present embodiment, through a jointly acquisition and imaging of the seismic wave and the electric field data (an existing surface wave prospecting uses only the seismic wave components for a detection), a collection system may be arbitrarily arranged according to a detection area, requiring neither a linear or other regular shapes nor an offset. Therefore, they can be arranged in any shapes according to an environment of a detection site, which can reflect an underground velocity structure of the detection area more comprehensively, while comparing to a traditional surface wave observation system evenly spaced in a straight line and requiring a certain minimum offset, it has a higher applicability.

S220, superposing the dispersion spectrum of the seismic wave component and the dispersion spectrum of the electric field component, to obtain the superposed dispersion spectrum.

There is often an underground water level in a shallow surface medium of the Earth, and a medium above the water level, especially a medium close to the surface, can be approximated as an air-filled porous medium. Therefore, a four-layer pore half-space model is established according to an actual formation condition, and a plurality of parameters are shown in Table 1.

TABLE 1

Parameters of a four-layer half-space porous medium model with a high-speed interlayer

| Property | First layer medium | Second layer medium | Third layer medium | Fourth layer medium |
| --- | --- | --- | --- | --- |
| Type of pore fluid | air | water | air | air |
| Porosity $\varphi$ (%) | 5 | 25 | 0.1 | 0.1 |
| Darcy permeability $\kappa_0$ (meters square) | $1 \times 10^{-14}$ | $1 \times 10^{-12}$ | $1 \times 10^{-20}$ | $1 \times 10^{-20}$ |
| Solid volume modulus $K_s$ (GPa) | 4.4 | 7.0 | 4.46 | 6.83 |
| Fluid volume modulus $K_f$ (GPa) | $1.43 \times 10^{-4}$ | 2.2 | $1.43 \times 10^{-4}$ | $1.43 \times 10^{-4}$ |
| Solid skeleton volume modulus $K_{fr}$ (GPa) | 3.928 | 2.99 | 4.458 | 6.829 |
| Solid skeleton shear modulus G (GPa) | 0.0577 | 0.2266 | 0.1125 | 0.6984 |
| Fluid viscosity coefficient $\eta$ (Pa · s) | $1.8 \times 10^{-5}$ | $1 \times 10^{-3}$ | $1.8 \times 10^{-5}$ | $1.8 \times 10^{-5}$ |
| Solid density $\rho_s$ (Kg/m$^3$) | 1874 | 2133 | 1802 | 1942 |
| Fluid density $\rho_f$ (Kg/m$^3$) | 1.21 | 1000 | 1.21 | 1.21 |
| Fluid salinity $C_0$ (Mole/liter) | 0 | 0.1 | 0 | 0 |
| Absolute temperature T (Kalvin) | 298 | 298 | 298 | 298 |
| Relative permittivity of fluid $\kappa_f$ | 1 | 80 | 1 | 1 |
| Relative permittivity of solid $\kappa_s$ | 4 | 4 | 4 | 4 |
| Curvature $\alpha_\infty$ | 10 | 3 | 50 | 50 |
| Fluid conductivity $\sigma_f$ (Siemens/m) | 0 | 0.9275 | 0 | 0 |
| Volume conductivity $\sigma$ (Siemens/m) | 0.01 | 0.0773 | 0.01 | 0.01 |
| Fast longitudinal wave velocity $V_p$ (m/s) | 1500 | 1700 | 1600 | 2000 |
| Shear wave velocity $V_s$ (m/s) | 180 | 350 | 250 | 600 |
| Stratum depth z (m) | 0~10 | 10~20 | 20~40 | 40~ |

A second layer of the model is arranged as a porous medium saturated with water, while a plurality of other layers are arranged as a porous medium saturated with air, and a phreatic water surface locates at a depth of 10 meters underground. The seismic source is a vertical single force point source excited by a surface (a hammer hit, a drop hammer seismic source), and a source time function adopts a Ricker wavelet with a dominant frequency of 10 Hz and a delay time of 0.5 seconds; in order to facilitate a data collection, shown as FIG. 8, an observation system adopts a linear arrangement, having an inter-channel space of 2 meters, and a total of 91 channels. The shot set records of the seismic wave component received and the shot set records of the electric field component are shown in FIG. 1. According to the shot set records of each seismic wave component and the shot set records of each electric field component, a recorded dispersion spectrum is shown as FIG. 2, wherein a dotted line represents a theoretical dispersion curve of the Rayleigh wave calculated by the formation parameters.

S220 comprises steps:

S221. superposing the dispersion spectrum of the seismic wave vertical component and the dispersion spectrum of the electric field radial component to obtain the superposed dispersion spectrum; or S222. superposing the dispersion spectrum of the seismic wave radial component and the dispersion spectrum of the electric field radial component to obtain the superposed dispersion spectrum; or S223. superposing the dispersion spectrum of the seismic wave vertical component, the dispersion spectrum of the seismic wave radial component and the dispersion spectrum of the electric field radial component to obtain the superposed dispersion spectrum.

Figure 2:
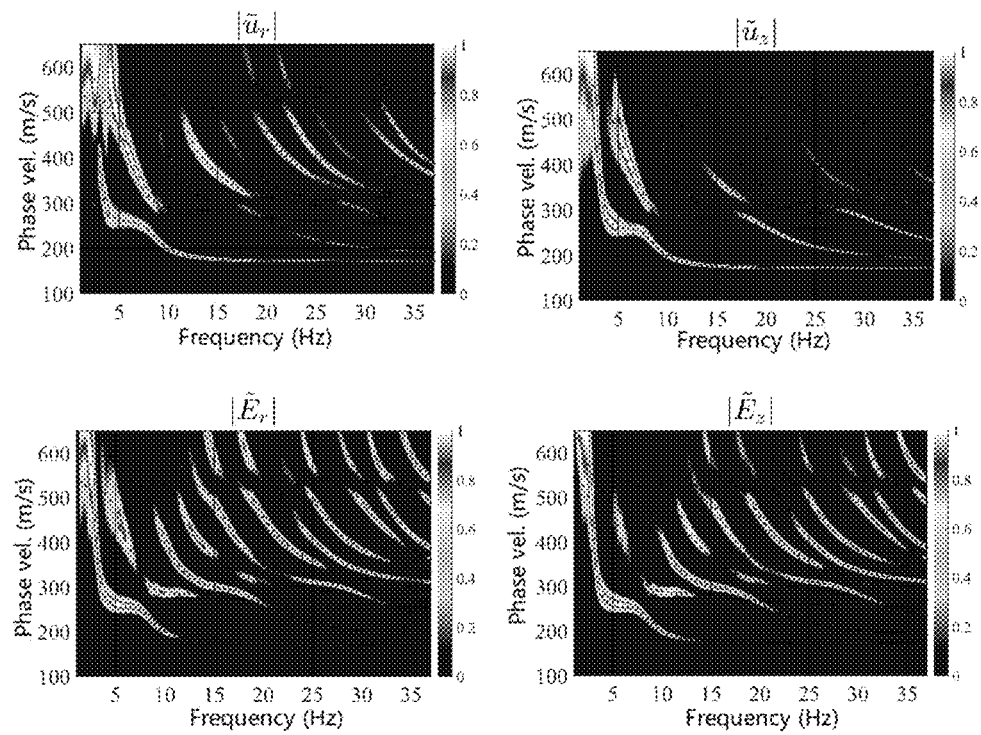
FIG. 2 illustrates a dispersion spectrum obtained by the shot set record of the seismic wave components $u_r$, $u_z$, and the electric field components $E_r$, $E_z$ in the present invention.

From FIG. 1, it can be seen that the Rayleigh wave dominates the shot set records, and in the surface wave area, the high mode of the electric field components $E_r$, $E_z$ are more developed than that of the seismic wave components $u_r$, $u_z$. The black dotted line in the dispersion spectrum of FIG. 2 is a theoretical dispersion curve. It can be seen that a position of a maximum energy in the dispersion spectrum coincides with that of the theoretical dispersion curve, thus a Rayleigh wave dispersion curve may be extracted through the maximum energy value. From FIG. 2 it can be seen that, in the dispersion spectrum ($|\tilde{E}_r|,|\tilde{E}_z|$) of the electric field component $E_r$, $E_z$, an imaging quality of the Rayleigh wave in the high-order mode is significantly higher than the dispersion spectrum ($|\tilde{u}_r|,|\tilde{u}_z|$) of the seismic component $u_r$, $u_z$; an imaging frequency band of the basic-order mode of the dispersion spectrum of $u_r$, $u_z$ is significantly wider than that of the dispersion spectrum of $E_r$, $E_z$. Therefore, performing an inversion on the multi-mode dispersion curve jointly extracted by the seismic wave components and the electric field components will greatly reduce a versatility of the inversion, thereby greatly improving an accuracy and a stability of the inversion.

Figure 3A:
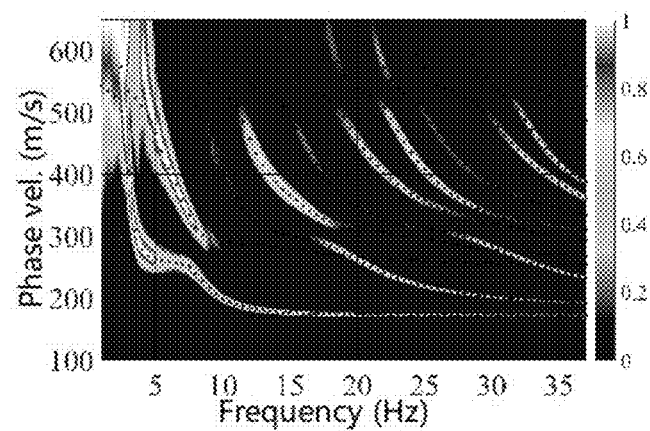
FIG. 3a illustrates a superposed dispersion spectrum $D_{Seismic}$ obtained by the dispersion spectrum of the seismic wave components $u_r$, $u_z$ in the present invention.
Figure 3B:
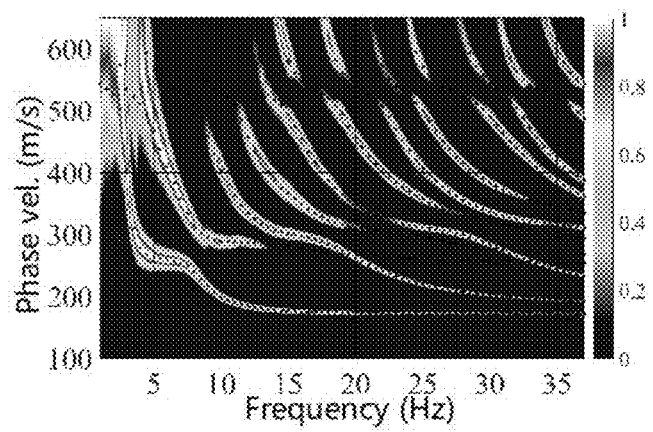
FIG. 3b illustrates a superposed dispersion spectrum $D_{Seismoelectric}$ obtained by the dispersion spectrum of the radial electric field $E_r$ and the dispersion spectrum of the seismic wave components $u_r$, $u_z$ in the present invention.

From FIG. 3a, it can be seen that the high-order mode imaging in the dispersion spectrum $D_{Seismic}$ obtained by superposing the seismic wave components $u_r$, $u_z$ only, is still not as much as the high-order mode obtained by the electric field components. Considering that the signal of the vertical component $E_z$ of the electric field is relatively weak and a data acquisition in an actual detection is hard, thus in a practical application, the dispersion spectrum of the radial component $E_r$ of the electric field and $D_{Seismic}$ are superposed to obtain a new dispersion spectrum $D_{Seismoelectric}$ (shown as FIG. 3b), it can be seen that, in a superposed dispersion spectrum, the imaging qualities of both the base-order mode and the high-order mode are improved.

Figure 4A:
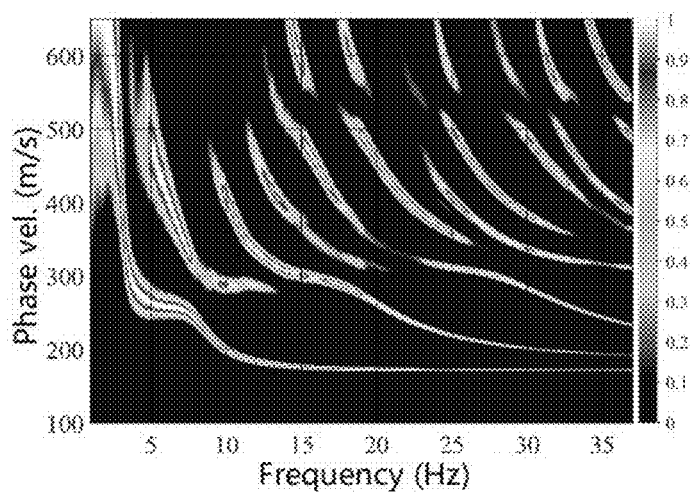
FIG. 4a illustrates a superposed dispersion spectrum obtained by a superposition of $u_z$, $E_r$ in the present invention.
Figure 4B:
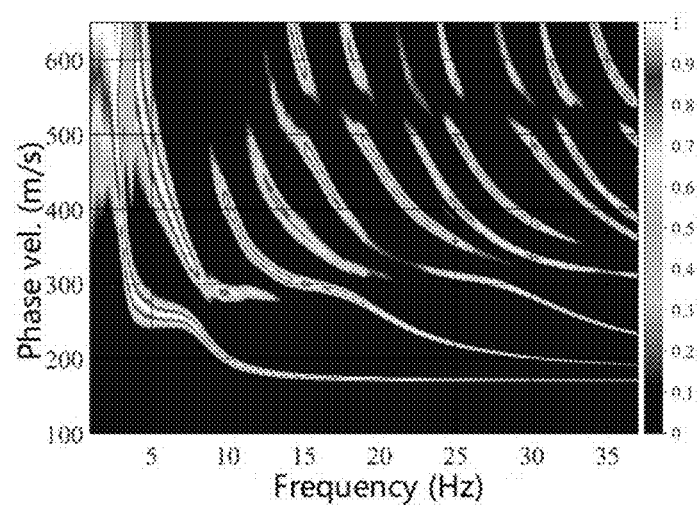
FIG. 4b illustrates a superposed dispersion spectrum obtained by a superposition of $u_r$, $u_z$, $E_r$ in the present invention.
Figure 5:
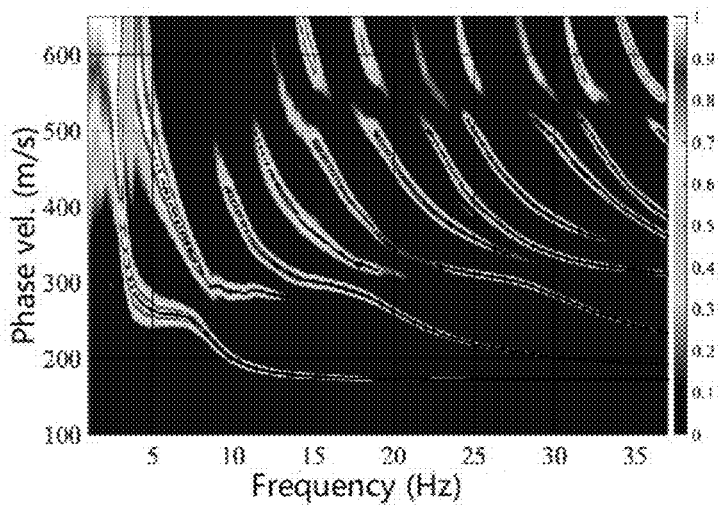
FIG. 5 illustrates a schematic diagram on the dispersion curve in the present invention.
Figure 6:
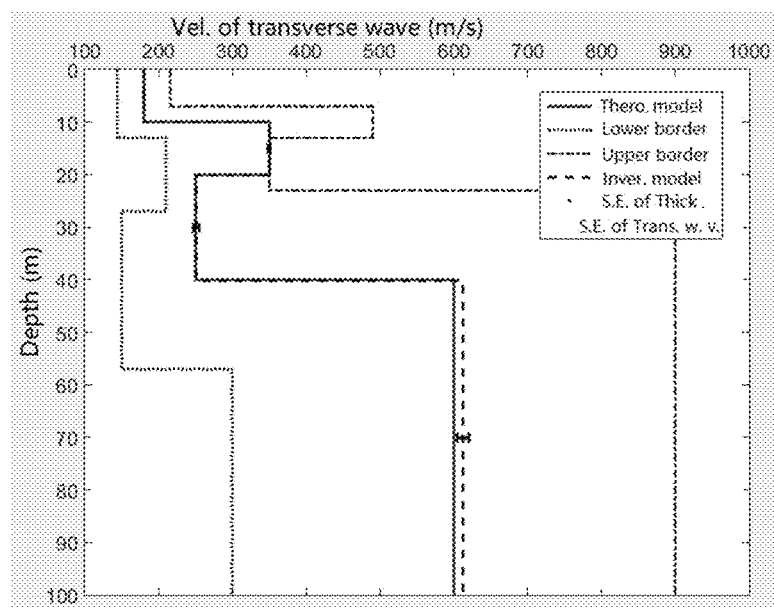
FIG. 6 illustrates a formation velocity structure obtained by an inversion to the multi-mode dispersion curve in the present invention.

An acquisition of the seismic wave radial component $u_r$ requires a transform of two horizontal components, in an actual detection, a three-component geophone is required for an acquisition, while an acquisition of the vertical component $u_z$ of the seismic wave requires only a vertical geophone, which is not only economical but efficient, thus the dispersion spectrums by a superposition of $u_z$, $E_r$ is compared with a superposed dispersion spectrum of three components of $u_r$, $u_z$, $E_r$. FIG. 4a illustrates the dispersion spectrum obtained by superposing $u_z$, $E_r$, FIG. 4b illustrates the dispersion spectrum obtained by superposing $u_r$, $u_z$, $E_r$, it can be seen that there is no significant difference in between. Therefore, it is also possible to perform a superposition of $u_z$, $E_r$ only, to avoid an acquisition and a superposition of multi-seismic wave, and the electric field component. Thus it is possible to reduce an acquisition cost effectively, on a premise of ensuring a quality of the dispersion spectrum imaging.

S300. performing an extraction processing onto the superposed dispersion spectrum to obtain a dispersion curve, and performing an inversion processing onto the dispersion curve to obtain a stratum structure profile.

Specifically, the S300 comprises a plurality of steps:

S310. extracting the superposed dispersion spectrum by an energy maximum to obtain the dispersion curve.

Specifically, the dispersion curve is a multi-mode dispersion curve comprising the basic-order mode and the high-order mode. By setting a region, then by a method of using a computer program to automatically search for a maximum point in the region, a multi-mode dispersion curve comprising the basic-order mode and the high-order mode is extracted from the dispersion spectrum (see FIG. 5) for a later inversion.

S320. establishing an initial inversion stratum model, and using a plurality of inversion methods to fit the dispersion curve to obtain the stratum structure profile.

Specifically, the inversion methods comprise at least one of: a genetic algorithm, a swarm algorithm, and a quasi-Newton algorithm. Establishing an initial inversion stratigraphic model based on a basic data, then a plurality of inversion methods including the genetic algorithm, the swarm algorithm (a particle swarm, a bee colony, and more.), the quasi-Newton algorithm and more, are applied to simulate the multi-mode dispersion curve extracted from FIG. 5, therefore the stratigraphic structure is inversed, shown as FIG. 6.

Figure 7:
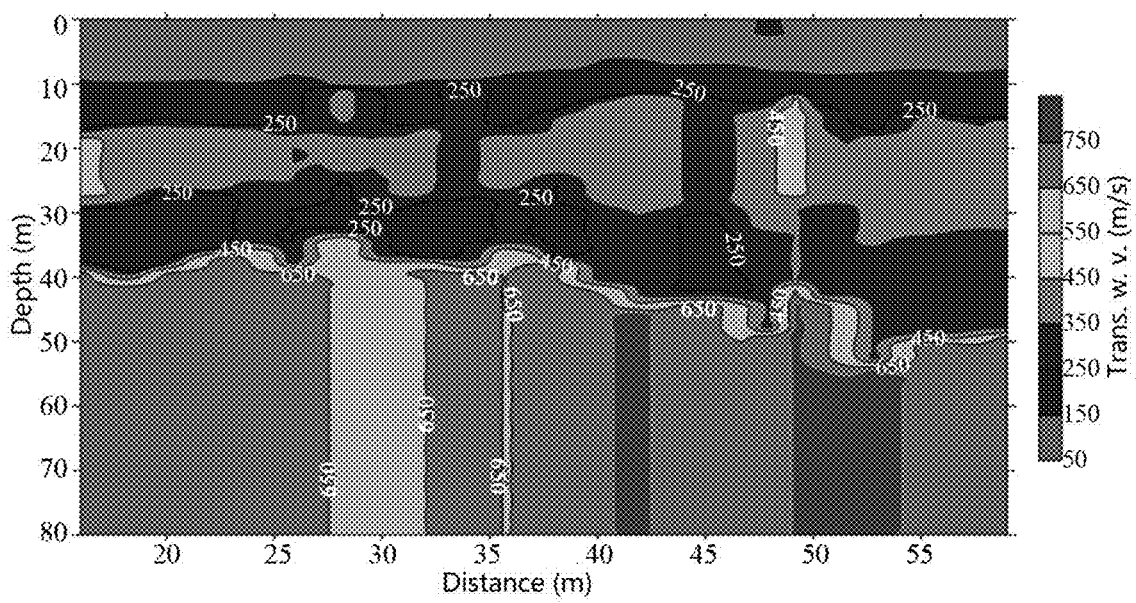
FIG. 7 illustrates a velocity structure profile of a formation transverse wave drawn by an interpolation to the velocity structure inversed by a plurality of surface wave in a survey line.
Figure 8:
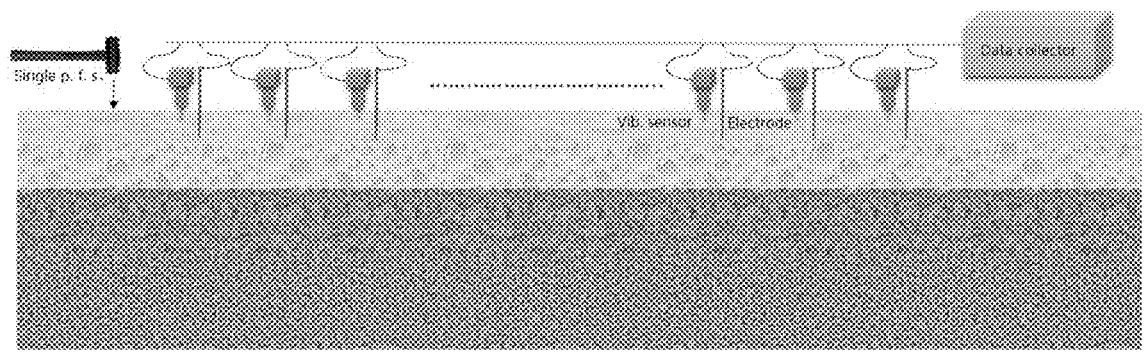
FIG. 8 illustrates a schematic diagram on a jointly collection of the seismic and electrical collection of the present invention.

A velocity structure of multiple stratum positions will be obtained by moving the observation system, and the velocity structures of a plurality of different positions are interpolated, before being able to draw a stratum section according to a plurality of spatial positions, shown as FIG. 7.

Based on any one of the embodiments on the surface wave prospecting method for jointly extracting the Rayleigh wave frequency dispersion characteristics by the seismoelectric field, the present invention further provides a plurality of preferred embodiments on a surface wave prospecting device for jointly extracting the Rayleigh wave frequency dispersion characteristics by the seismoelectric field:

The surface wave prospecting device for jointly extracting the Rayleigh wave frequency dispersion characteristics by the seismoelectric field as described in an embodiment of the present invention comprises: a collection device, applied to acquiring the plurality of jointly collected data; wherein the plurality of jointly collected data comprises: a seismic wave data and an electric field data;

a jointly imaging device, applied to performing a jointly imaging processing onto the jointly collected data to obtain the superposed dispersion spectrum;

an inversion device, applied to performing the extraction processing onto the superposed dispersion spectrum to obtain the dispersion curve, and performing the inversion processing onto the dispersion curve to obtain the stratum structure profile.

The seismic wave data comprises: a seismic wave component; the electric field data composes: an electric field component.

The jointly imaging device is specifically applied to obtaining a dispersion spectrum of the seismic wave component and a dispersion spectrum of the electric field component according to the seismic wave component and the electric field component, respectively; and superposing the dispersion spectrum of the seismic wave component and the dispersion spectrum of the electric field component, before obtaining a superposed dispersion spectrum.

The jointly imaging device is further applied to extracting respectively an imaginary part of the seismic wave component and an imaginary part of the electric field component, before performing a frequency scanning to obtain the dispersion spectrum of the seismic wave component and the dispersion spectrum of the electric field component.

The seismic wave component comprises: a seismic wave radial component and/or a seismic wave vertical component; the electric field component comprises: an electric field radial component and/or an electric field vertical component.

The jointly imaging device is further applied to superposing the dispersion spectrum of the seismic wave vertical component and the dispersion spectrum of the electric field radial component to obtain the superposed dispersion spectrum; or superposing the dispersion spectrum of the seismic wave radial component and the dispersion spectrum of the electric field radial component to obtain the superposed dispersion spectrum; or superposing the dispersion spectrum of the seismic wave vertical component, the dispersion spectrum of the seismic wave radial component and the dispersion spectrum of the electric field radial component to obtain the superposed dispersion spectrum.

The inversion device is specifically applied to extracting the superposed dispersion spectrum by an energy maximum to obtain the dispersion curve; the dispersion curve is a multi-mode dispersion curve comprising the basic-order mode and the high-order mode.

The inversion device is further applied to establishing an initial inversion stratum model, and using a plurality of inversion methods to fit the dispersion curve to obtain the stratum structure profile; the inversion methods comprise at least one of: a genetic algorithm, a swarm algorithm, and a quasi-Newton algorithm.

Based on any one of the embodiments on the surface wave prospecting method for jointly extracting the Rayleigh wave frequency dispersion characteristics by the seismoelectric field, the present invention further provides a plurality of preferred embodiments on a terminal device:

the terminal device described in an embodiment of the present invention, comprises: a processor, and a storage connected to the processor.

the storage has a surface wave prospecting program for jointly extracting the Rayleigh wave dispersion characteristics by the seismoelectric field stored, and a plurality of following steps are implemented when the surface wave prospecting program for extracting the Rayleigh wave dispersion characteristics jointly by the seismoelectric field is executed by the processor:

acquiring the plurality of jointly collected data; wherein the plurality of jointly collected data comprises: a seismic wave data and an electric field data;

performing the jointly imaging processing onto the jointly collected data to obtain the superposed dispersion spectrum;

performing the extraction processing onto the superposed dispersion spectrum to obtain the dispersion curve, and performing the inversion processing onto the dispersion curve to obtain the stratum structure profile.

The seismic wave data comprises the seismic wave component; the electric field data composes the electric field component.

When the surface wave prospecting program for extracting the Rayleigh wave dispersion characteristics jointly by the seismoelectric field is executed by the processor, a plurality of following steps are further implemented:

obtaining a dispersion spectrum of the seismic wave component and a dispersion spectrum of the electric field component according to the seismic wave component and the electric field component, respectively;

superposing the dispersion spectrum of the seismic wave component and the dispersion spectrum of the electric field component, to obtain a superposed dispersion spectrum.

When the surface wave prospecting program for extracting the Rayleigh wave dispersion characteristics jointly by the seismoelectric field is executed by the processor, a plurality of following steps are further implemented:

extracting respectively an imaginary part of the seismic wave component and an imaginary part of the electric field component, before performing a frequency scanning to obtain the dispersion spectrum of the seismic wave component and the dispersion spectrum of the electric field component.

The seismic wave component comprises: a seismic wave radial component and/or a seismic wave vertical component; the electric field component comprises: an electric field radial component and/or an electric field vertical component.

When the surface wave prospecting program for extracting the Rayleigh wave dispersion characteristics jointly by the seismoelectric field is executed by the processor, a plurality of following steps are further implemented:

superposing the dispersion spectrum of the seismic wave vertical component and the dispersion spectrum of the electric field radial component to obtain the superposed dispersion spectrum; or superposing the dispersion spectrum of the seismic wave radial component and the dispersion spectrum of the electric field radial component to obtain the superposed dispersion spectrum; or superposing the dispersion spectrum of the seismic wave vertical component, the dispersion spectrum of the seismic wave radial component and the dispersion spectrum of the electric field radial component to obtain the superposed dispersion spectrum.

When the surface wave prospecting program for extracting the Rayleigh wave dispersion characteristics jointly by the seismoelectric field is executed by the processor, a plurality of following steps are further implemented:

extracting the superposed dispersion spectrum by an energy maximum to obtain the dispersion curve.

The dispersion curve is a multi-mode dispersion curve comprising the basic-order mode and the high-order mode.

When the surface wave prospecting program for extracting the Rayleigh wave dispersion characteristics jointly by the seismoelectric field is executed by the processor, a plurality of following steps are further implemented:

establishing an initial inversion stratum model, and using a plurality of inversion methods to fit the dispersion curve to obtain the stratum structure profile.

The inversion methods comprise at least one of: a genetic algorithm, a swarm algorithm, and a quasi-Newton algorithm.

Based on any one of the embodiments on the surface wave prospecting method for jointly extracting the Rayleigh wave frequency dispersion characteristics by the seismoelectric field, the present invention further provides a plurality of preferred embodiments on a storage medium:

The storage medium described in an embodiment of the present invention, wherein has the surface wave prospecting program for jointly extracting the Rayleigh wave dispersion characteristics by the seismoelectric field stored thereon, and a plurality of following steps are implemented when the surface wave prospecting program for extracting the Rayleigh wave dispersion characteristics jointly by the seismoelectric field is executed by the processor:

acquiring the plurality of jointly collected data; wherein the plurality of jointly collected data comprises: a seismic wave data and an electric field data;

performing the jointly imaging processing onto the jointly collected data to obtain the superposed dispersion spectrum;

performing the extraction processing onto the superposed dispersion spectrum to obtain the dispersion curve, and performing the inversion processing onto the dispersion curve to obtain the stratum structure profile.

It should be understood that, the application of the present invention is not limited to the above examples listed. Ordinary technical personnel in this field can improve or change the applications according to the above descriptions, all of these improvements and transforms should belong to the scope of protection in the appended claims of the present invention.

What is claimed is:

1. A method comprising:
    acquiring a plurality of jointly collected data, wherein the plurality of jointly collected data comprises seismic wave data that comprises a seismic wave component and electric field data that comprises an electric field component;
    performing a jointly imaging processing onto the plurality of jointly collected data by obtaining a dispersion spectrum of the seismic wave component and a dispersion spectrum of the electric field component according to the seismic wave component and the electric field component, respectively, and superposing the dispersion spectrum of the seismic wave component and the dispersion spectrum of the electric field component to obtain a superposed dispersion spectrum;
    performing an extraction processing onto the superposed dispersion spectrum to obtain a dispersion curve; and
    performing an inversion processing onto the dispersion curve to obtain a stratum structure profile.

2. The method according to claim 1, wherein the obtaining of the dispersion spectrum of the seismic wave component and the dispersion spectrum of the electric field component according to the seismic wave component and the electric field component, respectively, further comprises:
    extracting respectively an imaginary part of the seismic wave component and an imaginary part of the electric field component, before performing a frequency scanning to obtain the dispersion spectrum of the seismic wave component and the dispersion spectrum of the electric field component.

3. The method according to claim 1, wherein the seismic wave component further comprises:
    a seismic wave radial component and/or a seismic wave vertical component; and the electric field component comprises:
    an electric field radial component and/or an electric field vertical component.

4. The method according to claim 3, wherein the superposing of the dispersion spectrum of the seismic wave component and the dispersion spectrum of the electric field component to obtain the superposed dispersion spectrum, further comprises:
    superposing the dispersion spectrum of the seismic wave vertical component and the dispersion spectrum of the electric field radial component to obtain the superposed dispersion spectrum; or
    superposing the dispersion spectrum of the seismic wave radial component and the dispersion spectrum of the electric field radial component to obtain the superposed dispersion spectrum; or
    superposing the dispersion spectrum of the seismic wave vertical component, the dispersion spectrum of the seismic wave radial component and the dispersion spectrum of the electric field radial component to obtain the superposed dispersion spectrum.

5. The method according to claim 1, wherein the performing of the extraction processing onto the superposed dispersion spectrum to obtain the dispersion curve, further comprises:
    extracting the superposed dispersion spectrum by an energy maximum to obtain the dispersion curve.

6. The method according to claim 1, wherein performing of the inversion processing onto the dispersion curve to obtain the stratum structure profile, further comprises:
    establishing an initial inversion stratum model, and
    using a plurality of inversion methods to fit the dispersion curve to obtain the stratum structure profile; and the inversion methods comprise at least one of: a genetic algorithm, a swarm algorithm, and a quasi-Newton algorithm.

7. A device comprising:
    a collection device configured to acquire the plurality of jointly collected data, wherein the plurality of jointly collected data comprises: a seismic wave data and an electric field data;
    a jointly imaging device configured to perform a jointly imaging processing onto the jointly collected data by obtaining a dispersion spectrum of the seismic wave component and a dispersion spectrum of the electric field component according to the seismic wave component and the electric field component, respectively, and superposing the dispersion spectrum of the seismic wave component and the dispersion spectrum of the electric field component to obtain a superposed dispersion spectrum; and
    an inversion device configured to perform the extraction processing onto the superposed dispersion spectrum to obtain the dispersion curve and perform the inversion processing onto the dispersion curve to obtain the stratum structure profile.

* * * * *